(12) United States Patent  
Ballou et al.

(10) Patent No.: US 8,185,767 B2  
(45) Date of Patent: May 22, 2012

(54) AUTOMATIC MANAGEMENT OF A POWER STATE OF A DEVICE WITH NETWORK CONNECTIONS

(75) Inventors: Nat Ballou, Kirkland, WA (US); Kevin Kaufmann, Median, WA (US); Brian Cates, Poulsbo, WA (US); William Casperson, Bothell, WA (US); Darren Shakib, North Bend, WA (US); Kevin Eugene Mason, Kirkland, WA (US); Sompong Paul Olarig, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 12/147,502

(22) Filed: Jun. 27, 2008

(65) Prior Publication Data

US 2009/0327782 A1    Dec. 31, 2009

(51) Int. Cl.  
*G06F 1/00* (2006.01)

(52) U.S. Cl. .................................. 713/330; 713/300

(58) Field of Classification Search ............... 713/300, 713/330  
See application file for complete search history.

(56) References Cited

U.S. PATENT DOCUMENTS

| | | | |
|---|---|---|---|
| 4,698,748 A | 10/1987 | Juzswik et al. | |
| 5,404,544 A | 4/1995 | Crayford | |
| 5,802,305 A * | 9/1998 | McKaughan et al. | ........ 709/227 |
| 6,000,003 A | 12/1999 | Allen et al. | |
| 6,292,508 B1 | 9/2001 | Hong et al. | |
| 6,463,542 B1 | 10/2002 | Yu et al. | |
| 6,993,667 B1 * | 1/2006 | Lo | .................. 713/320 |
| 7,103,785 B2 * | 9/2006 | Green et al. | .................. 713/310 |
| 7,137,018 B2 | 11/2006 | Gutman et al. | |
| 7,325,149 B2 | 1/2008 | Liu et al. | |
| 7,350,087 B2 | 3/2008 | Naveh et al. | |
| 7,437,217 B2 * | 10/2008 | Lehr et al. | ..................... 700/297 |
| 7,537,163 B2 * | 5/2009 | Kikuta | ........................ 235/462.3 |
| 7,577,857 B1 * | 8/2009 | Henderson et al. | ........... 713/320 |
| 2006/0218419 A1 | 9/2006 | Iwamura et al. | |
| 2007/0076747 A1 | 4/2007 | Zinaty | |
| 2007/0162773 A1 | 7/2007 | Krantz et al. | |
| 2007/0245165 A1 | 10/2007 | Fung | |

OTHER PUBLICATIONS

"Power Management for Network Devices", Dec. 4, 2001. http://www.microsoft.com/whdc/archive/netpm.mspx.  
"SPC800", 2003. http://www.apwpresident.com/spcseries.html.  
"Remote Power Management" http://www.42u.com/remote_reboot.htm.  
"Datacenter Management Solutions Intelligent Power Management", 42U. http://www.42u.com/pdf/Int_Power_CS.pdf.  
International Search Report and Written Opinion Received for PCT Application No. PCT/US2009/045097, mailed on Jan. 4, 2010, 10 pages.

* cited by examiner

*Primary Examiner* — Nitin Patel

(57) ABSTRACT

Embodiments provide a process and system for automatic management of networked devices based on the state of the network connection. The process automatically manages the power state of a networked computerized device according to a trigger event that corresponds to the state of an attached network connection. The network connection of an attached networked device is monitored for a pre-defined trigger event. Once a trigger event has been observed, the power state of the attached network device is managed to correspond to the trigger event.

19 Claims, 6 Drawing Sheets

Exemplary Networking
Environment 500

AUTOMATIC MANAGEMENT OF A POWER STATE OF A DEVICE WITH NETWORK CONNECTIONS

BACKGROUND

Computerized systems have made a significant contribution towards the advancement of modern society and are utilized in a number of applications to achieve advantageous results. The storage of data using electronic means is one such example that has benefited from the utilization of computerized systems. Currently available computerized file systems, such as file servers, are capable of facilitating storage and sharing of data between networks of varying sizes. When access to data stored in a file system is granted broadly—such as over the Internet—multiple servers may be combined in datacenters to address accessibility and data storage concerns.

For many file storage systems deployed over a network, the state of the network connection is of critical importance. Numerous network connection protocols (throughout several levels of implementation) are employed, with varying levels of reliability, to communicate data (generally in the form of packets) between and among networked devices. These devices may include: file servers, client devices, and any network edge devices (e.g. routers, switches) along the path of communication. The complexities of network communication, i.e. the inherent difficulties of processing vast amounts of data at high speeds over logically and/or physically large distances, are such that interruptions to network communication are not altogether uncommon. Excessive network traffic, software bugs, mechanical design flaws and simple user error may all contribute to undesirable performance, such as packet delays, unresponsive devices and a total failure of network communication.

Unfortunately, as the complexity, capacity, and sophistication of servers in datacenters increase as industry standards develop, the gravity of interruptions to network communication may also escalate correspondingly. Thus, efficient and timely maintenance of servers in a datacenter has become a paramount concern. Accordingly, automated management schemes have been developed to address these concerns. Repairing the state of a network connection for a datacenter may require reinitializing a networked server by power cycling a server (i.e., turning the server off and turning the server back on).

In some instances, when a server is hung, rebooting may be one way to recover the server. Additionally, when provisioning servers, it may be necessary to reboot a server in order to trigger it to reattempt the server's pre-boot execution environment ("PXE") boot to enable an updated operating system to be installed on the server. Accordingly, since the rebooting procedure is so important to these basic operations it is absolutely vital for the procedure to be performed reliably. Otherwise, the servers may require manual intervention and drastic and costly repairs could be attempted unnecessarily.

Wake on LAN ("WOL," sometimes "WoL") is an Ethernet computer networking standard that allows a computer to be turned on or woken up from a low power state (e.g., hibernate or sleep) remotely by a network message. Wake on LAN support is typically implemented in the motherboard of a computer and may not be restricted to LAN traffic, but rather, working on all network traffic, including Internet traffic.

The general process of waking a computer up remotely over a network connection includes a target computer being shut down (e.g., Sleeping, Hibernating, or "Soft Off,"), with power reserved for the network card. The network card listens for a specific data packet, referred to as the "magic packet," a broadcast frame containing anywhere within its payload a specific sequence of data and the MAC (media access control) address of the target computer. The magic packet is broadcast on the broadcast address for that particular subnet (or an entire LAN).

When a listening computer receives this packet, the packet is checked to verify that the packet contains the correct information (i.e., the target MAC address contained in the packet matches the MAC address of the machine), a valid match causes the computer to switch on and boot. In order for Wake on LAN to work, parts of the network interface need to stay on, even during standby. This increases the standby power used by the computer. If Wake on LAN is not needed, turning it off may reduce power consumption while the computer is off but still plugged in. However, while Wake on LAN allows a computer to be turned on or woken up from a low power state, Wake on LAN is administered via a properly running network. As such, Wake on Lan is incapable of causing a computer to reboot itself, and/or to reinitialize and repair a network connection of the computer.

There exist a few available methods to address the problem of remote re-initialization. One method to address this problem is through the use of servers with IPMI functionality. IPMI (Intelligent Platform Management Interface) is a loosely-defined standard to allow for out of band management (i.e. management over a dedicated channel) of a server and includes the ability to control the power to a server. IPMI supports a variety of connection types including independent network connection, shared network connection or serial connection.

However, all three connection types present impediments to efficient power management. Independent network connections and serial connections incur additional costs, since additional components are required, such as connectors, a serial concentrator or a network switch. Sharing a network connection eliminates these costs, but has other issues. First, it may be difficult to identify the correct media access control ("MAC") address of the IPMI network device from the network device (e.g., router) of the server. Second, an IPMI network device requires its own IP address which can be an issue in scenarios where IP addresses are limited. Third, if a server has a bug causing it to flood the network, it may not be possible to get IPMI packets through to an IPMI controller.

Additionally, a typical IPMI management device has a very complicated set of features making the code complicated and thus, vulnerable to bugs—some of which may not manifest until the device has been widely deployed. This is aggravated by the fact that upgrading the code may require a hard power cycle of the box which cannot be performed by a IPMI device.

A second method of automating server management is through advanced power strips with management functionality ("manager power strips"). With a manager power strip, one or more servers are plugged into a power strip with a network connection. Software is implemented on the power strip that can be utilized to turn the power on or off. Unlike IPMI devices, this solution requires few network connections, generally requires very little software running in the power strip (thereby decreasing the likelihood of software bugs) and leverages an already existing connection to the server, e.g., the power cable. However, there are several limitations with this approach as well. Manager power strips cost more than traditional, unmanaged power strips and support fewer options than IPMI devices. Also, newer servers may be designed to be powered with direct current (instead of standard alternating current) and/or run at non-standard voltages which would not be supported by available manager power strips, or which may significantly increase costs. Additionally, newer servers are sharing power supplies for efficiency, thereby expanding the impact of managing power at the power strip level, further increasing the difficulty of specifically targeted application of power management.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments are directed to computer systems with attached network connections. Specifically, a computer system with a variable power state that corresponds to certain trigger events based on the state of the attached network connection.

In one embodiment, a process provides utilizing the network connection attached to a computer system to control the power state of the computer system. By configuring hardware to run when the network is active and shutdown when the network is not active, a network device such as a switch can be used to manage the power state on computer systems in a simple, relatively cheap fashion.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
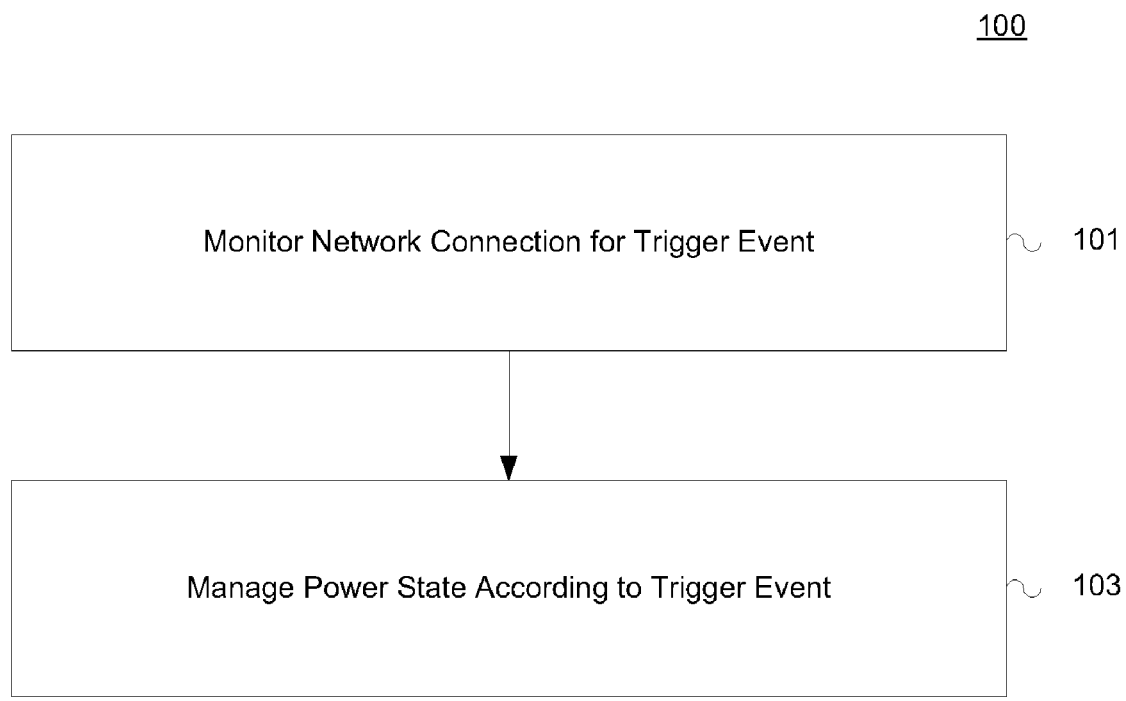
FIG. 1 depicts a flowchart of a process of automatically managing the power state of a networked device in accordance with various embodiments.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known process, procedures, components, and circuits have not been described in detail as not to unnecessarily obscure aspects and features of the subject matter.

Portions of the detailed description that follows are presented and discussed in terms of a process. Although steps and sequencing thereof are disclosed in a figure herein (e.g., FIG. 1) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the following embodiments, an approach is described for automated power management of a computerized device using network connections.

Automatically Managing a Power State of a Networked Device

With reference now to FIG. 1, a flowchart of a process 100 of automatically managing a power state of a networked device according to a link state of a network connection is depicted, in accordance with one embodiment. Although specific steps of process 100, 200 and 300 are disclosed, such steps are exemplary. That is, embodiments of the present invention are well suited to performing various other (additional) steps or variations of the steps recited in process 100, 200 and 300. It is appreciated that the steps in process 100, 200 and 300 may be performed in an order different than presented, and that not all of the steps in process 100, 200 and 300 may be performed.

With reference now to step 101, a network connection of a networked device is monitored for the occurrence of a trigger event. In one embodiment, the trigger event is the link state of the network connection. The link state of a network connection for a networked device corresponds to the status of the link associated with the port of a coupled network edge device (e.g., a router or switch). Typically, a network link for a network connection alternates between two states: on (i.e., active) and off (i.e., inactive). The two states designate the level of network activity (e.g., network packets) processed and/or transmitted through the port. Thus, a link which has failed is no longer working as intended to process and/or transmit network packets and would subsequently have an "off" (or "inactive") link state.

A networked device may include, but is not limited to, a host device, server, router, switch, bridge, disk array and network attached server (NAS). Network link types may include any link type using a carrier type signal for the link, such as Ethernet (for Local Area Network carriers), wireless carrier, wide area network (WAN), Fiber distributed data interface (FDDI), Token Ring, Fiber Optic and Fiber Channel.

Accordingly, when a link state which becomes active from an unresponsive or inactive state, the change in the link state (e.g., from inactive to active) may be used as a trigger event in one embodiment. Likewise, if a link state becomes unresponsive, fails, or otherwise indicates a stoppage of network activity, the change in the link state (e.g., from active to inactive) may be used as a trigger event in one embodiment. In another embodiment, a trigger event may comprise the transmission of active network packets over a timed period. According to this embodiment, the trigger event is utilized to maintain (or change) the current power state of the network connection. For example, to maintain a network connection at an active state, one or more instances of network activity must occur every timed period (e.g., every five minutes). If the network connection detects no network activity for the entire duration of a timed period, the power state of the corresponding network device may be adjusted accordingly (i.e., an inactive network connection state may cause the network device to reduce its rate of power consumption). In a further embodiment, if no network activity is detected for another (typically longer) period of time, the corresponding network device may be power-cycled.

Likewise, a trigger event may also be used to change the current state of the network connection. For example, if an inactive network connection detects one or more instances of network activity, the power state of the corresponding network device may be adjusted correspondingly.

A further embodiment is implemented as a specific network packet to be used as a trigger event. According to this embodiment, the network packet would not be processed by the main Network Interface Card (NIC), but which could trigger the device to shutdown or startup.

With reference to step 103, the power state of the networked device is managed to correspond to the trigger event observed in step 101. There are various embodiments that could be utilized to support managing power using the state of the network. Many systems already support an option to power up a sleeping (i.e. power conserving) system on network activity. In one embodiment, a system is configured to automatically power down a system if network is not active and to power it up if the network becomes active. This feature could be implemented with BIOS changes to existing hardware, for example.

In another embodiment, existing IPMI hardware could be reprogrammed to support the feature of utilizing the state of a network connection to manage the IPMI hardware device. IPMI configured in an inline management fashion could be used to detect the state of the network without actively using the network. The IPMI code could use its existing support to manage power to mirror the power state of a system based on the active state of the network.

In a further embodiment, existing hardware is altered to use the network link active trigger as a positive voltage trigger into a motherboard of the computer system to control power. In this embodiment there would be no specific software and instead server power would just mirror the network power.

Exemplary Power State Control Process

Figure 2:
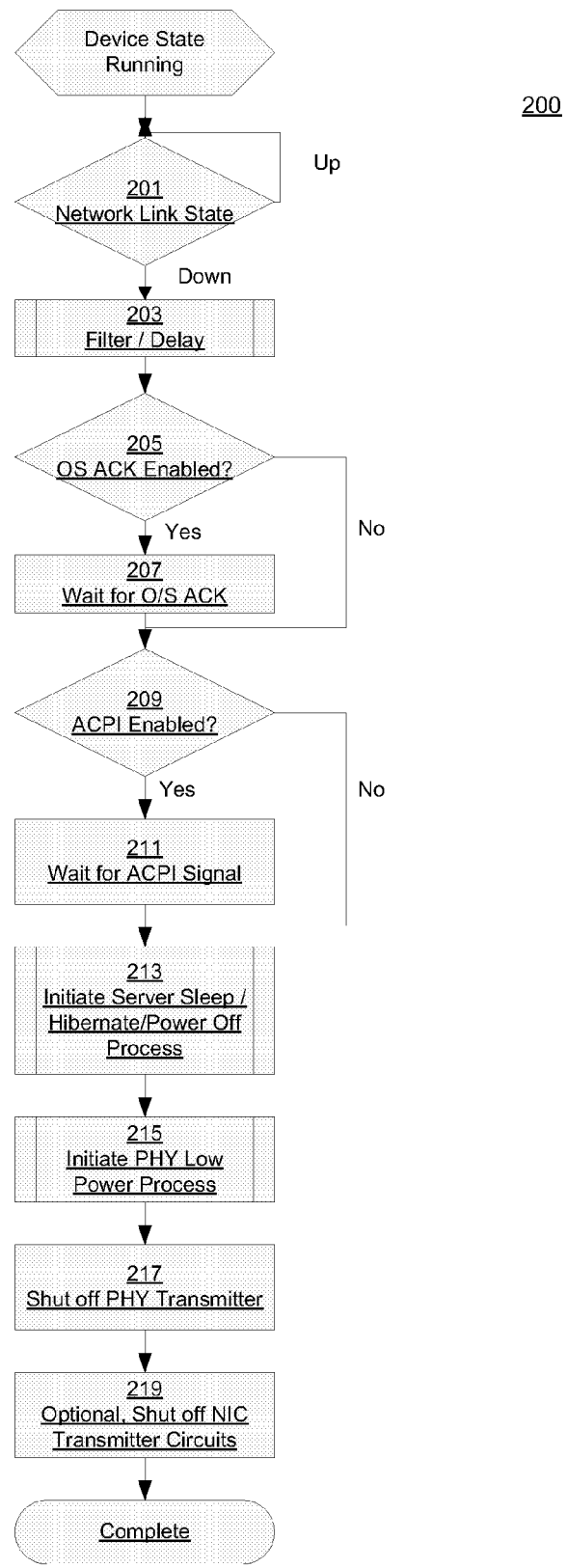
FIG. 2 depicts a flowchart of an exemplary process of managing a power state of a networked device in a standard operating power state according to the power state of a network link in accordance with various embodiments.

With reference now to FIG. 2, a flowchart of an exemplary process 200 of managing a power state of a networked device (e.g., host or server) in a standard operating power state according to the power state of a network link is depicted, in accordance with one embodiment. Steps 201-223 describe exemplary steps comprising the process 200 in accordance with the various embodiments herein described. According to FIG. 2, the networked device is operating ("running") within a standard powered state.

At step 201, a change in the power state of the network link of the device is detected. The power state of the network link (pertaining to Layer 1 of the OSI model) is distinguished from the link state of the network (pertaining to Layer 2 of the OSI model). If the power state of the network link is active (indicating the network is "up"), the process remains in step 201 until such a time as the power state of the network link is no longer active. Once the power state of the network link is detected to be inactive ("down"), the process proceeds to step 203.

At step 203, the change in the network link state detected at step 201 is received and filtered. Step 203 filters out changes in the network link state which may be spurious, transient and/or intermittent. Filtering may be configurable according to various methods (e.g., changes in the network link state with a duration less than ten seconds are ignored). Filtering may also comprise delaying an affirmative notice of a change in the network link state from propagating throughout the rest of the system and/or network until such a time as the nature of the change (e.g., whether the change is spurious) can be determined.

At optional step 205, the operating system of the device is examined to determine if the operating system provides a stateful check on the Sleep/Hibernate/Power Off process. A successful stateful check in step 205 (e.g., the operating system of the device is determined to be executing stateful applications) would cause the process to proceed to step 207. This determination is particularly applicable for devices with stateful applications which require a controlled sequence to prevent data loss or corruption. Systems with stateless applications may bypass step 207 and proceed directly to step 209. In one embodiment, a stateful check consists of an acknowledgement query from the operating system.

At optional step 207, a system with stateful applications may wait for an acknowledgement to proceed to the next step in the sequence. Systems with stateful applications may remain in optional step 207 according to a pre-established maximum duration. If no acknowledgement is received during the pre-established maximum duration, the process may proceed to optional step 209, or directly to step 213 according to various embodiments.

At optional step 209, the device and/or operating system of the device is examined to determine if the device and/or operating system supports advanced configuration and power interface (ACPI) features. ACPI allows the management of power in a device to be controlled by the operating system of the device. Devices and operating systems which are determined to not support ACPI may bypass step 211 and proceed directly to step 213.

At optional step 211, a device and/or operating system of the device determined to support ACPI features may wait for an ACPI signal to proceed to the next step in the sequence. Devices or operating systems which support ACPI features may remain in optional step 211 according to a pre-established maximum duration. If no signal is received during the pre-established maximum duration, the process may proceed directly to step 213.

At step 213, the process determines the completion of step 203 (and steps 205-211, in alternate embodiments), and the process to alter the power state of the device is initiated. According to some embodiments, the power state of the device may be pre-selected from a set of defined states (e.g., Sleep, Hibernate, Power Off). In further embodiments, the power state of the device may be pre-selected according to a set of established conditions (e.g., inactivity for an amount of time). Once the process to alter the power state of the device is completed, an indication that the process has been completed is passed to step 215.

At step 215, once the power state of the device has been reduced (during step 213), the components implementing the physical layer ("PHY") of the device are also reduced to its lowest possible state. In one embodiment, any amount of power beyond that which is necessary to monitor the change of the power state of the network link is shut off from the PHY.

At step 217 the PHY transmitter in Network Interface Card is shut off. By shutting off the transmitter, a major source of power consumption in the NIC is removed. In addition, shutting off the PHY transmitter also removes the ability of WoL to wake the device by itself, since a link cannot be established to another device without power being conducted to the transmitter. In some embodiments, the completion of step 217 proceeds directly to step 219.

At optional step 219, the transmitter circuits of the NIC are also shut off to achieve a maximum reduction in the consumption of power in the device. Optional step 219 may depend upon various embodiments according to hardware capabilities and available operating system states. At the conclusion of step 219, the process to convert the power state of a networked device from a fully-operational capacity to a low power state according to the power state of the network is completed.

Figure 3:
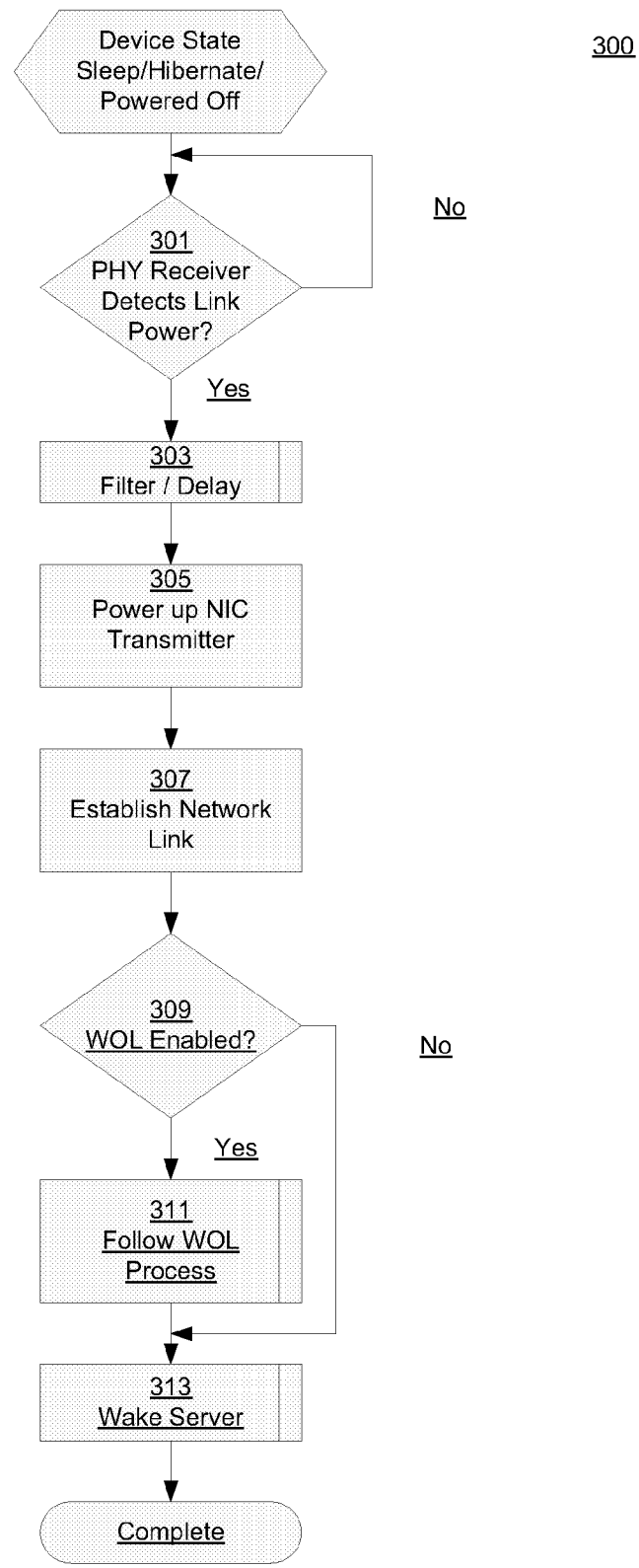
FIG. 3 depicts a flowchart of an exemplary process of managing a power state of a networked device in a reduced operating power state according to the power state of a network link in accordance with various embodiments.

With reference now to FIG. 3, a flowchart of an exemplary process 300 of managing a power state of a networked device in a reduced operating power state according to the power state of a network link is depicted, in accordance with one embodiment. Steps 301-313 describe exemplary steps comprising the process 200 in accordance with the various embodiments herein described. According to FIG. 3, a networked device (e.g., host or server) is operating ("running") at a reduced power state. A reduced power state may include, for example, a device which is sleeping, hibernating, or powered off.

At step 301, a change in the power state of the network link of the device is detected in the PHY receiver of the device. The power state of the network link (pertaining to Layer 1 of the OSI model) is distinguished from the link state of the network (pertaining to Layer 2 of the OSI model). If the power state of the network link is inactive (the network is "down"), the process remains in step 301 until such a time as the power state of the network link becomes active. Once the power state of the network link is detected to be active ("up"), the process proceeds to step 305.

At step 303, the change in the network link state detected at step 301 is received and filtered. Step 303 filters out changes in the network link state which may be spurious, transient and/or intermittent. Filtering may be configurable according to various methods (e.g., changes in the network link state with a duration less than ten seconds are ignored). Filtering may also comprise delaying an affirmative notice of a change in the network link state from propagating throughout the rest of the system and/or network until such a time as the nature of the change (e.g., whether the change is spurious) can be determined.

At step 305, after the filter and/or delay of step 303 has been applied, power to the circuitry of the transmitter of the NIC is re-supplied.

At step 307, once power to the circuitry of the transmitter of the NIC is restored, the NIC of the device will establish a link with a network.

At optional step 309, a determination of whether the device supports Wake on Lan features is made. A successful determination (e.g., the device supports Wake on Lan) causes the process to proceed to step 311. For devices which do not support Wake on Lan features, the process may proceed directly to step 313. Wake on Lan support allows an administrator to control when the device has achieved a fully operational power state.

At optional step 311, the process(es) according to the Wake on Lan features supported by the device (determined at step 309) for activating the device to achieve a fully operational power state is followed. A Wake on Lan feature may include any conventionally known Wake on Lan feature or process.

At step 313, the device is restored to a fully operational power state. If the device supports WoL features (determined in step 309), power is restored to the device according to the processes initiated in step 311. For devices which do not support WoL features, power to the device is restored according to conventional means, as determined by the operating system (for devices that support ACPI) and/or the BIOS of the device.

Exemplary Network Configuration

Figure 4:
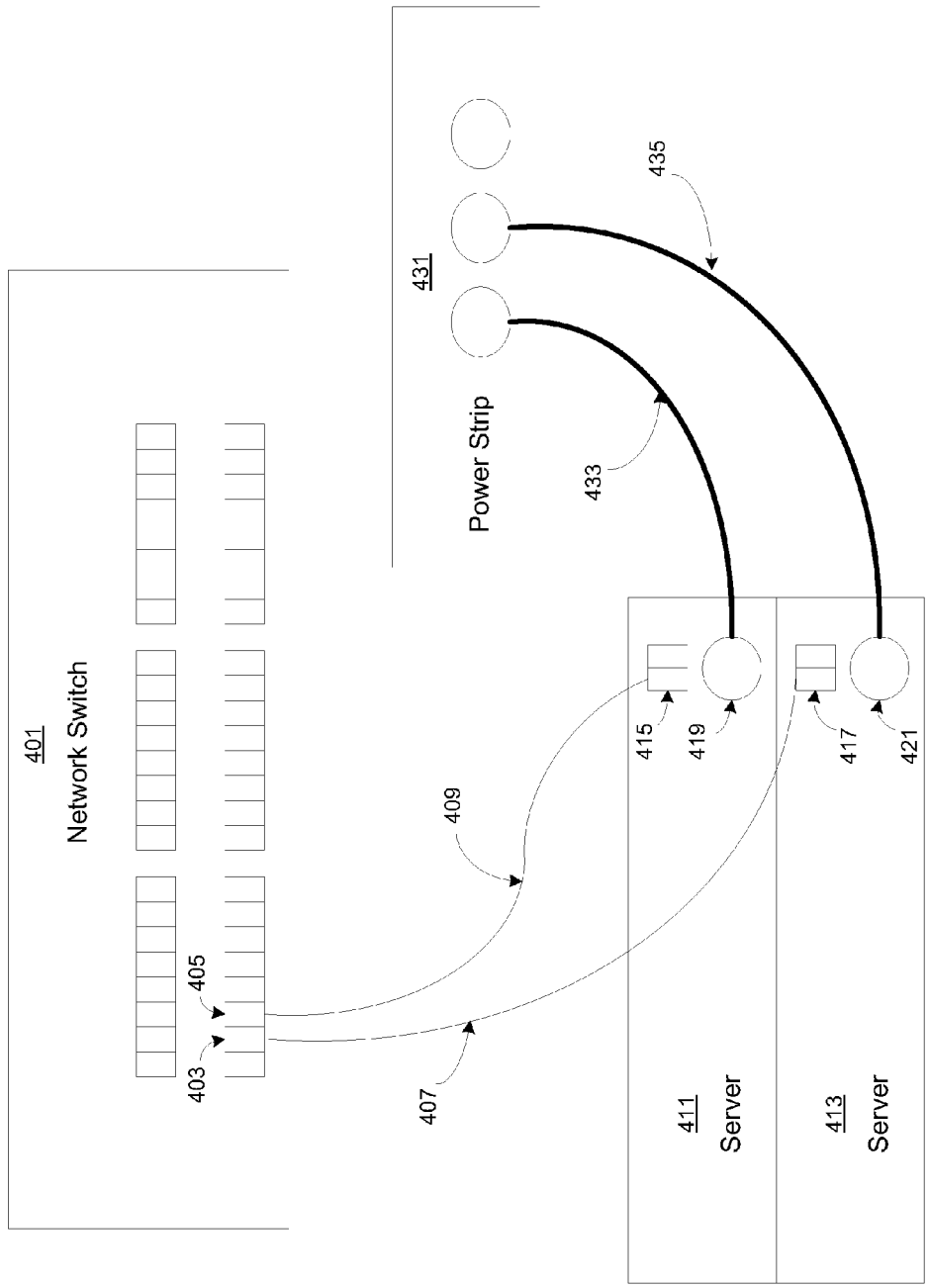
FIG. 4 depicts a graphical representation of an exemplary network configuration in accordance with various embodiments.

With reference now to FIG. 4, an exemplary network configuration 400 is depicted, in accordance with one embodiment. While exemplary network configuration 400 is shown as incorporating specific, enumerated features and elements, it is understood that such depiction is exemplary. Accordingly, embodiments are well suited to applications involving different, additional, or fewer elements, features, or arrangements.

As shown, exemplary network configuration 400 depicts a relatively simple network configuration: a number of network client devices, e.g., servers 411, 413, are attached to the network by means of a network edge device, e.g., network switch 401. As shown, clients may be discrete computer systems operating as servers. Also, the network device used in exemplary network configuration 400 may vary, but will typically include layer 2/4 switching and routing functionality. Network switch 401 is shown to include a plurality of ports arranged in two rows, e.g. port 403, 405. As depicted in exemplary network configuration 400, network interface 415 of server 411 is coupled to a port 405 of network switch 401 via a network connector (e.g., network cable 409). Likewise, network interface 417 of server 413 is coupled to a port (distinguished from the port coupled to network interface 415) in port 403 of network switch 401 via network cable 407.

Exemplary network embodiment 400 is also shown to include power strip 431, to supply power to server 411 and 413 in the configuration. Power strip 431 may be any conventionally used power strip device comprising a strip of sockets attached to the end of a flexible cable that allows multiple devices to be plugged in (i.e., coupled) to, and receive power from, a power source (e.g., wall outlet). In different embodiments, power strip 431 may also supply power to network switch 401. Power strip 431 supplies power to server 411 and 413 in the configuration through a power transmitting cable, e.g., power cord 433, 435. As presented in network embodiment 400, power source terminal 419 of server 411 is coupled to power strip 431 via power cord 433. Power source terminal 421 of server 413 is likewise coupled to power strip 431 via power cord 435.

According to some embodiments, the power state of server 411 and server 413 may be managed according to a trigger event which corresponds to the state of the network connection (e.g., network activity) processed and/or transmitted in network switch 401. The link state of the network connection of server 411, for example, comprises the state of the port of network switch 401 coupled to server 411 at network interface 415, via network cable 409. A change in the link state (e.g., from active to inactive, or from inactive to active) of the corresponding port in port row 405 of network switch 401 may act as a trigger event sufficient to alter the power state of server 407. Continuing this example, the power state of server 411 may be managed to correspond to a more appropriate level of power consumption. For instance, if the state of the network connection is off, the power state of server 411 may be adjusted to "sleep" mode, thus consuming less power, until another trigger event is monitored within the network connection. In other embodiments, a change in the link state (or other trigger event) may cause the server 411 to power cycle. For example, a link state that fails (i.e., does not receive or transmit packets) may cause the server 411 to power cycle.

Exemplary Networking Environment

Figure 5:
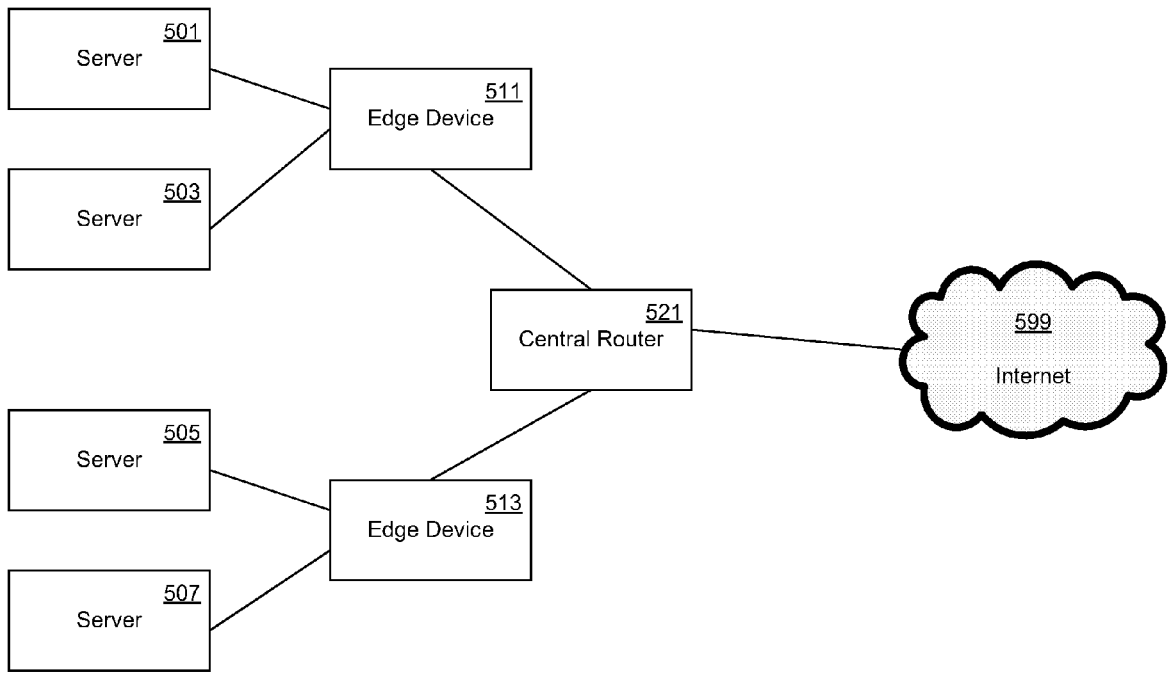
FIG. 5 depicts a graphical representation of an exemplary networking environment in accordance with various embodiments.

With reference now to FIG. 5, an exemplary networking environment 500 is depicted, in accordance with one embodiment. While exemplary networking environment 500 is shown as incorporating specific, enumerated features and elements, it is understood that such depiction is exemplary. Accordingly, embodiments are well suited to applications involving different, additional, or fewer elements, features, or arrangements.

As shown, exemplary networking environment 500 depicts a relatively simple networking environment: a number of networking client devices, e.g., servers 501, 503, 505, and 507, are attached to the network by means of network edge devices, e.g., edge devices 511 and 515. As shown, clients may be discrete computers operating as servers. Also, the edge devices used in exemplary networking environment 500 may vary, but will typically include layer 2/5 switching and routing functionality. According to one embodiment, servers 501, 503, 505 and 507 have power states managed according to trigger events which correspond to the state of the network connection. For example, the power state of server 501 and server 503 may correspond to the link state of the associated network ports of edge device 511. Likewise, the power state of server 505 and server 507 may correspond to the link state of the associated network pots of edge device 515.

Exemplary networking embodiment 500 is also shown to include a central router 551, e.g., to interconnect edge devices 511 and 515, as well as providing access to the Internet 599. In different embodiments, central router 551 may not be present, or may take a variety of forms, or provide a variety of features and services.

Basic Computing Device

Figure 6:
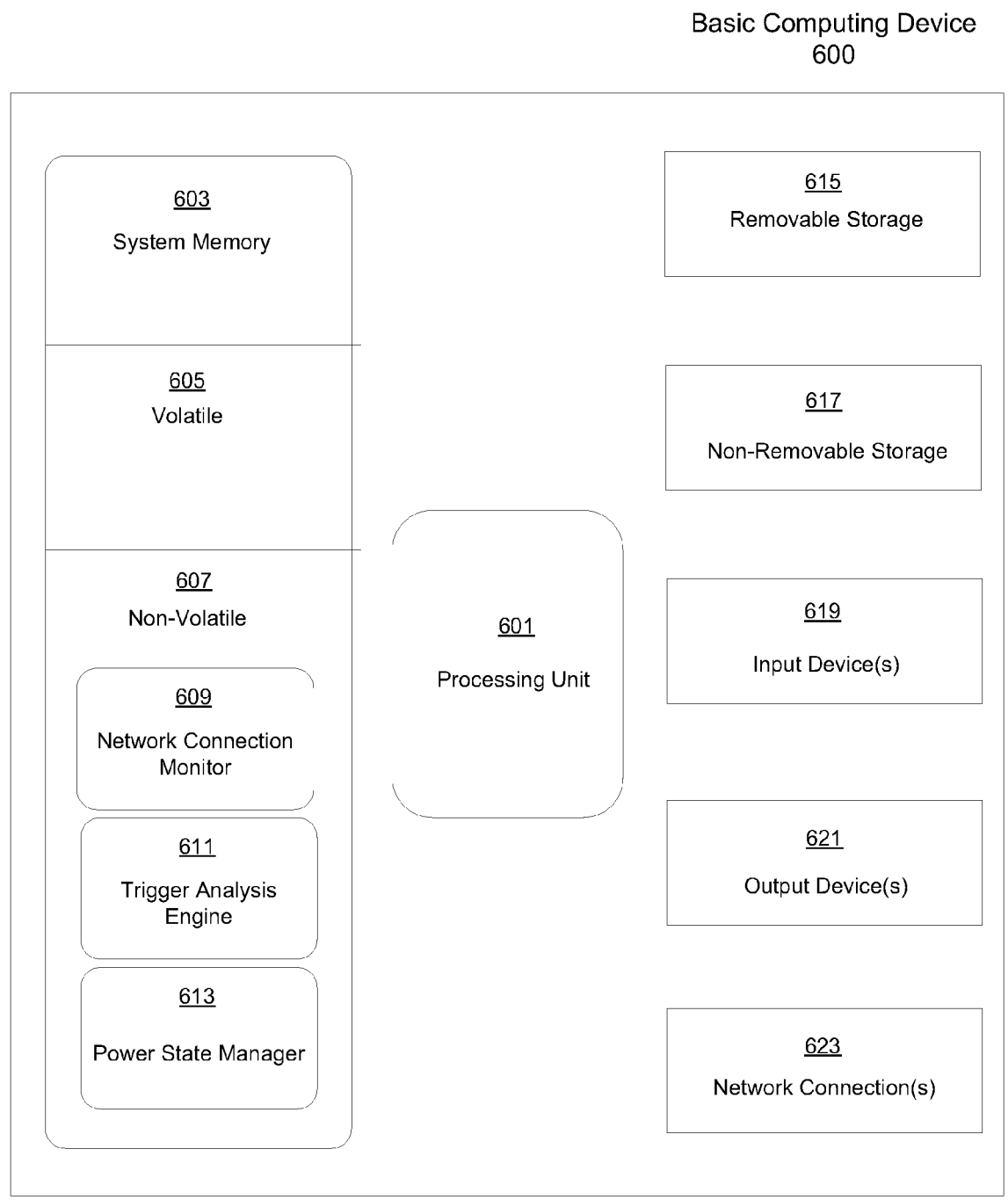
FIG. 6 depicts a graphical representation of a basic computing system in accordance with various embodiments.

FIG. 6 shows an exemplary computing device 600 according to various embodiments. Computing device 600 depicts the components of a basic computer system providing the execution platform for certain software-based functionality in accordance with various embodiments. Computing device 600 can be a networked device with a power state manageable according to certain trigger events which correspond to the state of a network connection.

Computing device 600 can be implemented as, for example, a desktop computer system, laptop computer system or server computer system. Similarly, computing device 600 can be implemented as a handheld device (e.g., cellphone, etc.) Computing device 600 typically includes at least some form of computer readable media. Computer readable media can be a number of different types of available media that can be accessed by computing device 600 and can include, but is not limited to, computer storage media.

In its most basic configuration, computing device 600 typically includes processing unit 601 and memory 603. Depending on the exact configuration and type of computing device 600 that is used, memory 603 can be volatile (such as RAM) 605, non-volatile 607 (such as ROM, flash memory, etc.) or some combination of the two. In one embodiment, network connection monitor 609, which monitors the state of a network connection coupled to the computing device 600, is instantiated in the non-volatile memory 605. Trigger analysis engine 611, used to analyze a trigger event and determine an appropriate power state of computing device 600 may also be instantiated in non-volatile memory 605. Similarly, power state manager 613 for managing the power state of the computing device 600 may also be instantiated in non-volatile memory 605. For example, network connection monitor 609, trigger analysis engine 611 and power state manager 613 may all be implemented in the BIOS of computing device 600, and stored in non-volatile memory 607.

Additionally, computing device 600 can include mass storage systems (removable 611 and/or non-removable 613) such as magnetic or optical disks or tape. Network connection monitor 609, trigger analysis engine 611 and power state manager 613 may also be implemented in a BIOS referenced from both removable 615 and non-removable 617 mass storage systems. Similarly, computing device 600 can include input devices 619 and/or output devices 621 (e.g., such as a display). Additionally, computing device 600 can include network connections 623 to other devices, computers, networks, servers, etc. using either wired or wireless media. As all of these devices are well known in the art, they need not be discussed in detail.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A process of automatically managing a power state of a computing device with a network connection to a network, the process comprising:
   monitoring, in the computing device, the network connection for a trigger event; and
   managing the power state of the computing device to correspond to an occurrence of the trigger event, the trigger event comprising a change in a link state of a first port of a network device providing access to the network connection to the computing device.

2. The process of claim 1, wherein managing the power state comprises power cycling the computing device 3. The process of claim 1, wherein managing the power state comprises changing the power state of the computing device from a first power state and a second power state, the second power state consuming less power than the first power state.

4. The process of claim 1, wherein managing the power state comprises changing the power state of the computing device from a first power state and a second power state, the second power state consuming more power than the first power state.

5. The process of claim 1, wherein the trigger event comprises network activity transmitted through the first port of the network device.

6. The process of claim 5, wherein the trigger event is a receipt or transmission of network packets through the first port of the network device within a pre-defined period of time.

7. The process of claim 5, wherein the trigger event is an absence of network packets received or transmitted through the first port of the network device within a pre-defined period of time.

8. The process of claim 6, wherein network packets further comprise a specific set of instructional packets.

9. The process of claim 1, wherein the trigger event comprises detecting a transmission of power to the device over a network cable.

10. The process claim 1, wherein a trigger event comprises detecting a termination of power transmitted to the system over a network cable.

11. A non-transitory computer readable media having computer executable components which, when executed by the computing device, causes the computing device to implement a power state management application, comprising:
   a network monitor for monitoring a network connection for a trigger event, the network connection comprising a first port of a plurality of ports of a network device facilitating the network connection;
   a trigger analysis engine for analyzing an observed trigger event to determine an appropriate corresponding power state for the computing device; and
   a power state manager for managing the power state of the computing device to conform to the appropriate power state corresponding to the observed trigger event, wherein, the trigger event is a state of the network connection.

12. The non-transitory computer readable media of claim 11, wherein the trigger event is comprised of network activity detected over the first port of the network device.

13. The non-transitory computer readable media of claim 11, wherein the trigger event is comprised of network inactivity in the first port of the network device.

14. The non-transitory computer readable media of claim 11, wherein the computer readable media is implemented in a data storage device.

15. A system, comprising:
   a computer having a processor coupled to a memory, the computer receiving power through a network cable;
   a network device comprising a plurality of ports, a first port of the plurality of ports being coupled to the computer via a network cable;
   wherein, a power state of the computer is automatically managed according to a trigger event corresponding to the transmission of power from the first port of the network device to the computer through the network cable.

16. The system of claim 15, wherein the trigger event is comprised of the commencement of power transmitted to the computer over the network cable.

17. The system of claim 16, wherein the trigger event is comprised of the termination of power transmitted to the computer over the network cable.

18. The system of claim 15, wherein the power state of the computer is automatically managed between a first power state and a second power state, the second power state consuming less power than the first power state.

19. The system of claim 15, wherein the power state of the computer is managed by power-cycling the computer.

* * * * *